US006938779B2

(12) United States Patent
Burnett

(10) Patent No.: US 6,938,779 B2

(45) Date of Patent: Sep. 6, 2005

(54) SCREEN ASSEMBLY FOR A SHALE SHAKER

(75) Inventor: George Alexander Burnett, Aberdeen (GB)

(73) Assignee: Varco I/P, Inc., Houston, TX (US)

( * ) Notice: Subject to any disclaimer, the term of this patent is extended or adjusted under 35 U.S.C. 154(b) by 210 days.

(21) Appl. No.: 10/418,744

(22) Filed: Apr. 21, 2003

(65) Prior Publication Data

US 2004/0074819 A1 Apr. 22, 2004

(30) Foreign Application Priority Data

Oct. 17, 2002 (GB) ............................................ 0224156

(51) Int. Cl.[7] .................................................. B07B 1/46

(52) U.S. Cl. ....................... 209/405; 395/397; 395/399; 395/409; 395/412

(58) Field of Search ................................ 209/405, 409, 209/412, 395, 397, 399

(56) References Cited

U.S. PATENT DOCUMENTS

| | | | | | |
|---|---|---|---|---|---|
| 2,774,477 | A | | 12/1956 | Pollitz | 209/403 |
| 3,256,992 | A | | 6/1966 | Eiling | 210/251 |
| 3,305,090 | A | * | 2/1967 | Morawski et al. | 209/288 |
| 3,968,033 | A | * | 7/1976 | Illemann et al. | 209/403 |
| 4,040,951 | A | * | 8/1977 | Cole | 209/408 |
| 4,224,146 | A | | 9/1980 | Kent et al. | 209/243 |
| 4,582,597 | A | | 4/1986 | Huber | 204/313 |
| 4,809,791 | A | | 3/1989 | Hayatdavoudi | 175/40 |
| 5,265,730 | A | | 11/1993 | Norris et al. | 209/326 |
| 5,277,319 | A | * | 1/1994 | Henry, Jr. | 209/399 |
| 5,361,911 | A | | 11/1994 | Waites, Sr. et al. | 209/399 |
| 5,417,858 | A | | 5/1995 | Derrick et al. | 210/388 |
| 5,615,776 | A | * | 4/1997 | Bjorklund et al. | 209/403 |
| 5,690,826 | A | | 11/1997 | Cravello | 210/384 |
| 5,755,334 | A | * | 5/1998 | Wojcik et al. | 209/399 |
| 5,950,841 | A | | 9/1999 | Knox et al. | 209/315 |
| 6,032,806 | A | | 3/2000 | Leone et al. | 209/402 |
| 6,179,128 | B1 | | 1/2001 | Seyffert | 209/405 |
| 6,267,246 | B1 | * | 7/2001 | Russell et al. | 209/399 |
| 6,283,302 | B1 | | 9/2001 | Schulte et al. | 209/399 |
| 6,543,621 | B2 | | 4/2003 | Baltzer et al. | 209/405 |
| RE38,303 | E | * | 11/2003 | Askew | 209/405 |
| 6,715,613 | B2 | * | 4/2004 | Eeles et al. | 209/405 |

FOREIGN PATENT DOCUMENTS

| | | | |
|---|---|---|---|
| EP | 1 002 588 A1 | 12/1997 | B07B/1/46 |
| GB | 1 526 663 | 4/1977 | |
| GB | 1 578 948 | 10/1977 | |
| GB | 1 526 663 A | 9/1978 | B07B/1/46 |
| GB | 2 176 424 A | 6/1986 | B07B/1/46 |
| GB | 2 176 425 A | 6/1986 | B07B/1/46 |
| GB | 2 176 424 A | 12/1986 | B07B/1/46 |
| GB | 2 206 501 A | 7/1987 | B01D/25/02 |
| GB | 2 223 189 A | 12/1988 | B07B/1/46 |
| GB | 2 312 858 | 3/1997 | B07B/1/46 |
| WO | WO 96/33792 | 4/1996 | B01D/33/03 |
| WO | WO 00 0 0264 | 1/2000 | B01D/33/03 |
| WO | WO 01 76719 | 10/2001 | B01D/33/00 |

OTHER PUBLICATIONS

Int'l Search Report, PCT/GB03/04469, Jan. 22, 2004, 4 pp.

* cited by examiner

*Primary Examiner*—Donald R Walsh
*Assistant Examiner*—Kaitlin Joerger
(74) *Attorney, Agent, or Firm*—Guy McClung

(57) ABSTRACT

A screen assembly for a shale shaker comprising a panel and a support structure, the panel having an area provided with a multiplicity of apertures and at least one layer of screening material arranged over the multiplicity of apertures, wherein said panel is removable from said support structure.

20 Claims, 9 Drawing Sheets

SCREEN ASSEMBLY FOR A SHALE SHAKER

The present invention relates to a screen assembly, for a shale shaker, a panel for a screen assembly, a support structure for a screen assembly, a shale shaker comprising a screen assembly, a shale shaker comprising a support structure and a method for fitting a screen assembly into a shale shaker.

In the drilling of a borehole in the construction of an oil or gas well, a drill bit is arranged on the end of a drill string and is rotated to bore the borehole. A drilling fluid known as "drilling mud" is pumped through the drill string to the drill bit to lubricate the drill bit. The drilling mud is also used to carry the cuttings produced by the drill bit and other solids to the surface through an annulus formed between the drill string and the borehole. The drilling mud contains expensive synthetic oil-based lubricants and it is normal therefore to recover and re-use the used drilling mud, but this requires the solids, to be removed from the drilling mud. This is achieved by processing the drilling fluid. The first part of the process is to separate the solids from the solids laden drilling mud. This is at least partly achieved with a shale shaker, such as those disclosed in U.S. Pat. No. 5,265,730, WO 96/33792 and WO 98/16328.

Shale shakers generally comprise an open bottomed basket having one open discharge end and a solid walled feed end. A number of rectangular screens are arranged in the basket, which are held in C-channel rails located on the basket walls, such as those disclosed in GB-A2,176,424. The basket is arranged on springs above a receptor for receiving recovered drilling mud. A skip or ditch is provided beneath the open discharge end of the basket. A motor is fixed to the basket, which has a drive rotor provided with an offset clump weight. In use, the motor rotates the rotor and the offset clump weight, which causes the basket and the screens fixed thereto to shake. Solids laden mud is introduced at the feed end of the basket on to the screens. The shaking motion induces the solids to move along the screens towards the open discharge end. The recovered drilling mud is received in the receptor for further processing and the solids pass over the discharge end of the basket into the ditch or skip.

The screens are generally of one of two types: hook-strip; and pre-tensioned.

The hook-strip type of screen comprises several rectangular layers of mesh in a sandwich, usually comprising one or two layers of fine grade mesh and a supporting mesh having larger mesh holes and heavier gauge wire. The layers of mesh are joined at each side edge by a strip which is in the form of an elongate hook. In use, the elongate hook is hooked on to a tensioning device arranged along each side of a shale shaker. The shale shaker further comprises a crowned set of supporting members, which run along the length of the basket of the shaker, over which the layers of mesh are tensioned. An example of this type of screen is disclosed in GB-A-1,526,663. The supporting mesh may be provided with or replaced by a panel having apertures therein.

The pre-tensioned type of screen comprises several rectangular layers of mesh, usually comprising one or two layers of fine grade mesh and a supporting mesh having larger mesh holes and heavier gauge wire. The layers of mesh are pre-tensioned on a rigid support comprising a rectangular angle iron frame and adhered thereto. The screen is then inserted into C-channel rails arranged in a basket of a shale shaker. An example of this type of screen is disclosed in GB-A-1,578,948.

A further example of a known rigid support is disclosed in WO 01/76719, which discloses, amongst other things, a flat panel like portion having apertures therein and wing portions which are folded to form a support structure, which may be made from a single sheet of material. This rigid support has been assigned the Trade Mark "UNIBODY" by the applicants.

European Patent Publication Number 1 002 588, discloses a panel comprising a plurality of groups of perforations, each group comprising six generally equally triangular apertures arranged with their apices facing a central portion, wherein the apices of two opposing ones of said triangular apertures are spaced apart further than the apices of opposed ones of the remaining triangular apertures.

The layers of mesh in the screens wears out frequently and therefore needs to be easily replaceable. Shale shakers are generally in the order of 5 ft wide and 10 ft long. A screen of dimensions 4 ft wide by 10 ft long is difficult to handle, replace and transport. It is known to use two, three, four or more screens in a single shale shaker. A standard size of screen currently used is of the order of 4 ft by 3 ft.

The inventor has noted that the support structure has to be very rigid. The inventor has also noted that all of the screen assembly need not be replaced. In one aspect, the present invention attempts to provide an easily replaceable panel for a screen assembly of the pre-tensioned type, which is rigid and lightweight, which heretoforth has not been recognised. It has been noted that a replaceable screen support is friendlier to the environment, as only the panel and worn layers of screening material need be sent for recycling and the screen support be reused on site.

The present invention also attempts to provide a panel for a screen, which will increase the life of layers of screening material arranged thereon.

The present invention also attempts to retain rigidity in the screen assembly.

In accordance with the present invention, there is provided a screen assembly for a shale shaker, the screen assembly comprising a panel and a support structure, the panel having an area provided with a multiplicity of apertures and at least one layer of screening material arranged over the multiplicity of apertures, wherein said panel is removable from said support structure. The layers of screening material are the most likely components of a screen assembly to fail in use. A screen assembly of the present invention allows replacement of the panel with layers of screening material attached thereto, without having to replace the entire screen assembly.

Preferably, the support structure is removable from said shale shaker. Advantageously, the screen assembly is insertable into a clamping mechanism of a shale shaker. Advantageously, there is a friction fit between the panel and the support structure. The panel may be provided with wing portions which fit over the support structure to provide a friction fit, such that the panel may be aligned thereon.

The panel is preferably not glued, adhered or welded to the support structure.

Advantageously, the screen assembly further comprises a pull down member located within the panel for pulling the panel on to the support structure. Preferably, the pull down member is linked to said panel at at least two intermediate points. Preferably, the pull down member is releasably connected to the panel. Advantageously, the pull down member comprises a rail and preferably, the panel comprises a rail, which co-operate to enable the pull down member to pull on said panel. Preferably, the panel is rectangular and the pull down member is located between sides of the rectangular panel Advantageously, the pull down member is operated by the clamping mechanism preferably, such that, in use, the clamping mechanism pushes down on the pull down member, which pulls the panel on to the support structure. Most advantageously, at least a portion of the perimeter of the panel is, in use, arranged in the clamping mechanism, such that the perimeter of the panel is pushed on to the support structure by the clamping mechanism. Preferably, the pull down member comprises at least one rib, which advantageously extends between sides of the rectangular panel. Advantageously, the at least one rib has two ends each having a top face which, in use is contactable by said clamping mechanism. Preferably, the pull down member comprises a plurality of ribs linked by a side runner on each of said two ends to form said top face which, in use is contactable by said clamping mechanism. Advantageously, the support structure comprises a plurality of support ribs on which, in use the panel is pushed or pulled on to. Preferably, each support rib has a top edge which is flat, in use the panel is pushed or pulled on to the flat top edge.

Advantageously, the support structure may have a crowned profile and preferably the panel is pushed down over the support structure by a clamping mechanism at an outer perimeter of the panel.

Preferably, the panel comprises a flat punched plate which may be mild steel, aluminium or a plastics material. Advantageously, the panel has apertures punched, drilled, sawn, or cast therein. The panel preferably comprises folded portions, which portions are preferably perimeter portions and advantageously portions forming said apertures.

Preferably, the at least one layer of screening material is adhered to at least a portion of said panel. Advantageously, the panel has side portions, which are not provided with apertures. Preferably, said at least one layer of screening material is adhered to side portions of said panel and advantageously, to said area provided with apertures. Preferably, the at least one layer of screening mesh comprises at least a second layer of screening mesh arranged underneath the at least one layer, wherein said mesh size may be the same or larger the at least one layer and may have larger diameter wires making up the mesh. Advantageously, a third layer of mesh is provided.

Advantageously, the panel is flexible, preferably such that the panel may change shape when a force is applied to it by the clamping mechanism of the shale shaker. The clamping mechanism may provide a tonne of force over the side edges of the screen assemblies which are arranged in the shale shaker, which may cover 3 to 12 m over 1 to 2 cm in width through a pneumatic hose. Advantageously, the panel is flexible, wherein it is easy to apply the layers of screening material to the panel and advantageously, wherein it is easy to transport the panel with at least one layer of screening material arranged thereon.

The present invention also provides a panel for the screen assembly of the invention, the panel having a perimeter comprising a multiplicity of apertures and a member arranged inside said perimeter for reception with a pull down member to pull said panel on to a support structure.

The present invention also provides a support structure for a screen assembly comprising a plurality of substantially parallel support ribs having top edges, characterised in that said top edges are flat.

The present invention also provides a shale shaker comprising a screen assembly of the invention, the shale shaker comprising a basket, a vibratory mechanism and a clamping mechanism for fixing the screen assembly to the basket. Preferably, the clamping mechanism firmly fixes the panel to the support structure. Advantageously, the clamping mechanism comprises a pneumatic means. Preferably, the pneumatic means comprises a pneumatic hose.

The present invention also provides a shale shaker comprising a basket, a vibratory mechanism and a set of support ribs arranged across said basket characterised in that said ribs have flat top edges and a clamping mechanism arranged about the basket. Preferably, the clamping mechanism comprises a pneumatic bladder.

The present invention also provides a screen assembly for a shale shaker, the screen assembly comprising a panel and a support structure, said panel having a multiplicity of apertures and having two opposing side portions characterised in that said panel has at least one member intermediate said two opposing side portions for pulling said panel on to said support structure.

Advantageously, the panel is removable from said support structure. Preferably, the support structure is removable from the shale shaker.

A method for fitting a screen assembly in a shale shaker, the screen assembly comprising a panel having at least one layer of mesh arranged thereon and a support structure, the method comprising the steps of inserting the screen assembly into a clamping mechanism of a shale shaker, operating the clamping mechanism wherein at least part of a perimeter of said panel of said screen assembly is pushed down on to said support structure.

Preferably, the screen assembly further comprises a pull down member, and the method further comprises the step of operating the clamping mechanism depresses a pull down member, pulling intermediate parts of said panel on to said support structure.

For a better understanding of the present invention, reference will now be made, by way of example, to the accompanying drawings, in which.

Figure 2:
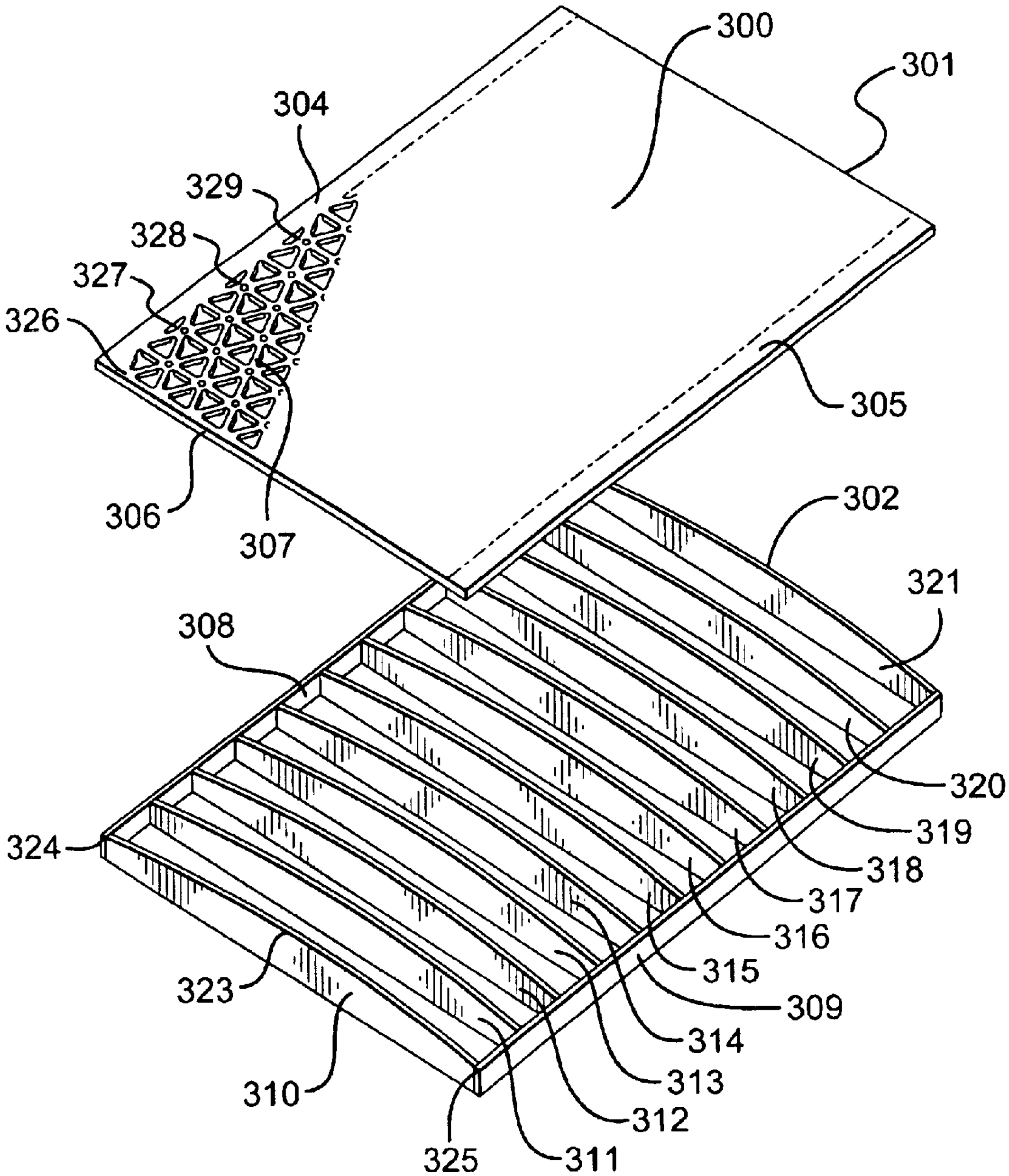
FIG. 2 is an exploded view of a screen assembly in accordance with the present invention, the screen assembly comprising layers of screening material, a panel and a support structure.
Figure 2A:
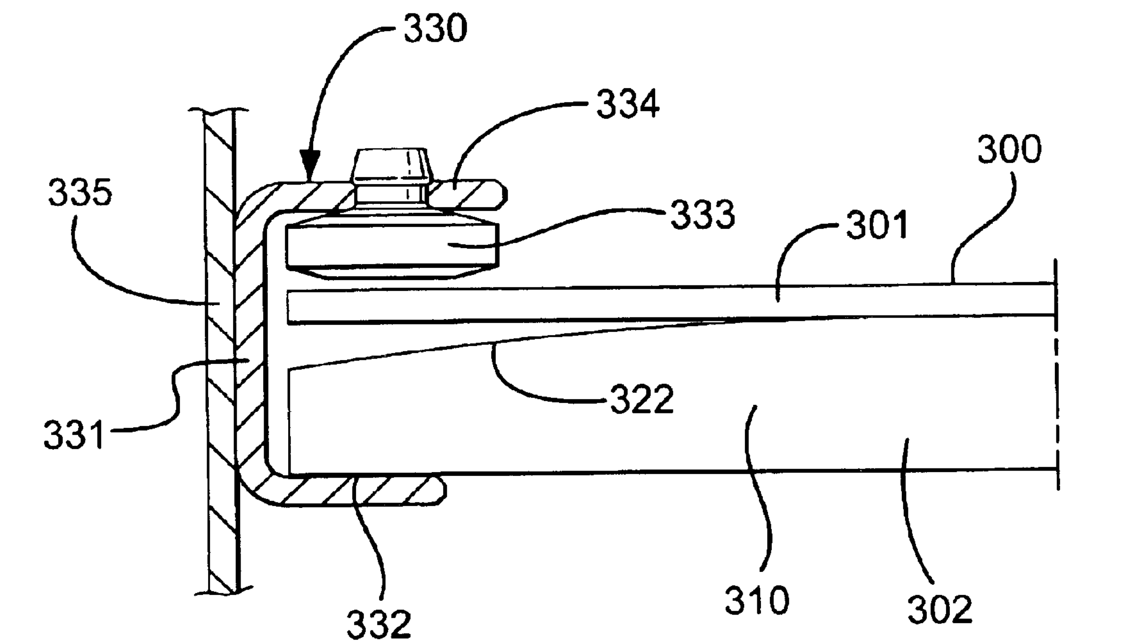
Figure 2B:
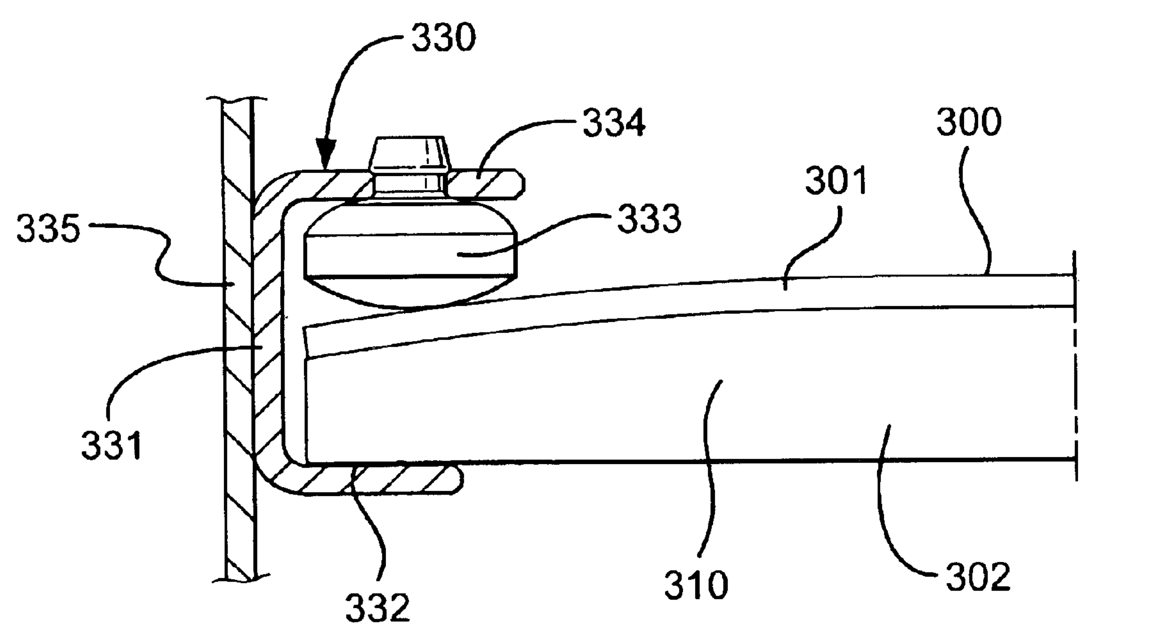
Figure 3:
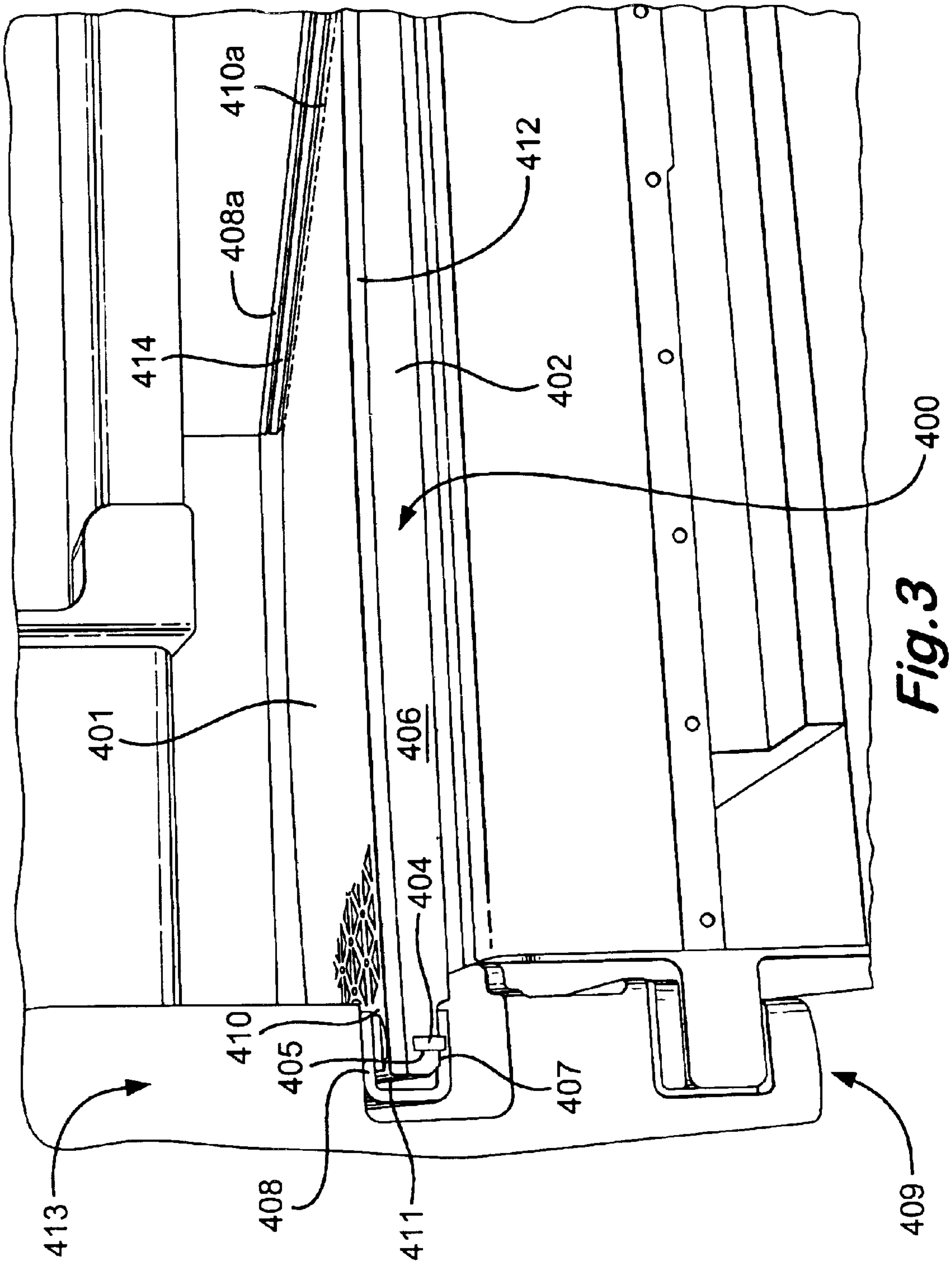

FIG. 2A is a side schematic view of part of the screen assembly shown in FIG. 2, the screen assembly arranged in a clamping rail of a shale shaker; and FIG. 2B is a side schematic view of part of the screen assembly shown in FIG. 2, the screen assembly clamped in a clamping rail of a shale shaker; and FIG. 3 is a perspective view of a screen assembly in accordance with the invention in a shale shaker.

Figures 1, 1A, 1B, 1C:
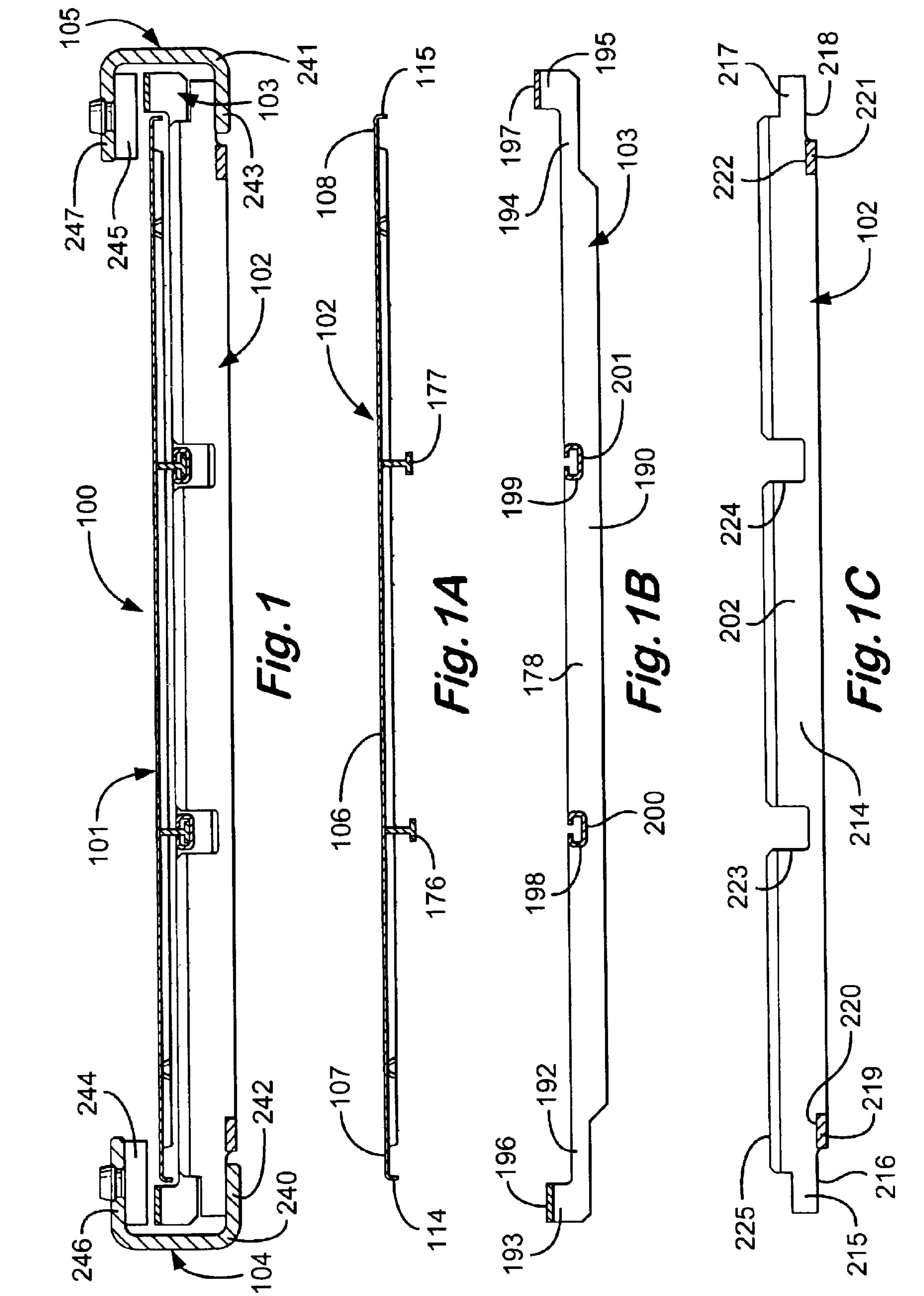
FIG. 1 is a rear end view of a screen assembly in accordance with the present invention, partly in cross-section and arranged in clamping rails of a shale shaker, the screen assembly comprising a panel, a support structure and a pull down member.
FIG. 1A is a cross-sectional view of the panel shown in FIG. 1.
FIG. 1B is an end view of the pull down member shown in FIG. 1.
FIG. 1C is an end view of the support structure shown in FIG. 1.

Referring to FIG. 1, there is shown a screen assembly, generally identified by reference numeral 100. The screen assembly 100 comprises a panel 101, a support structure 102 and a pull down member 103. In use, the panel 101 would have at least one layer of screening material adhered or otherwise attached thereto. Typically, each layer of screening material comprises a layer of wire mesh. Typically, the panel 101 would have three layers of screening material lying one over the other, the lowermost layer of screening having larger openings and larger wires. In use, the screen assembly 100 is arranged in clamping rails 104 and 105 of a shale shaker.

Figure 1D:
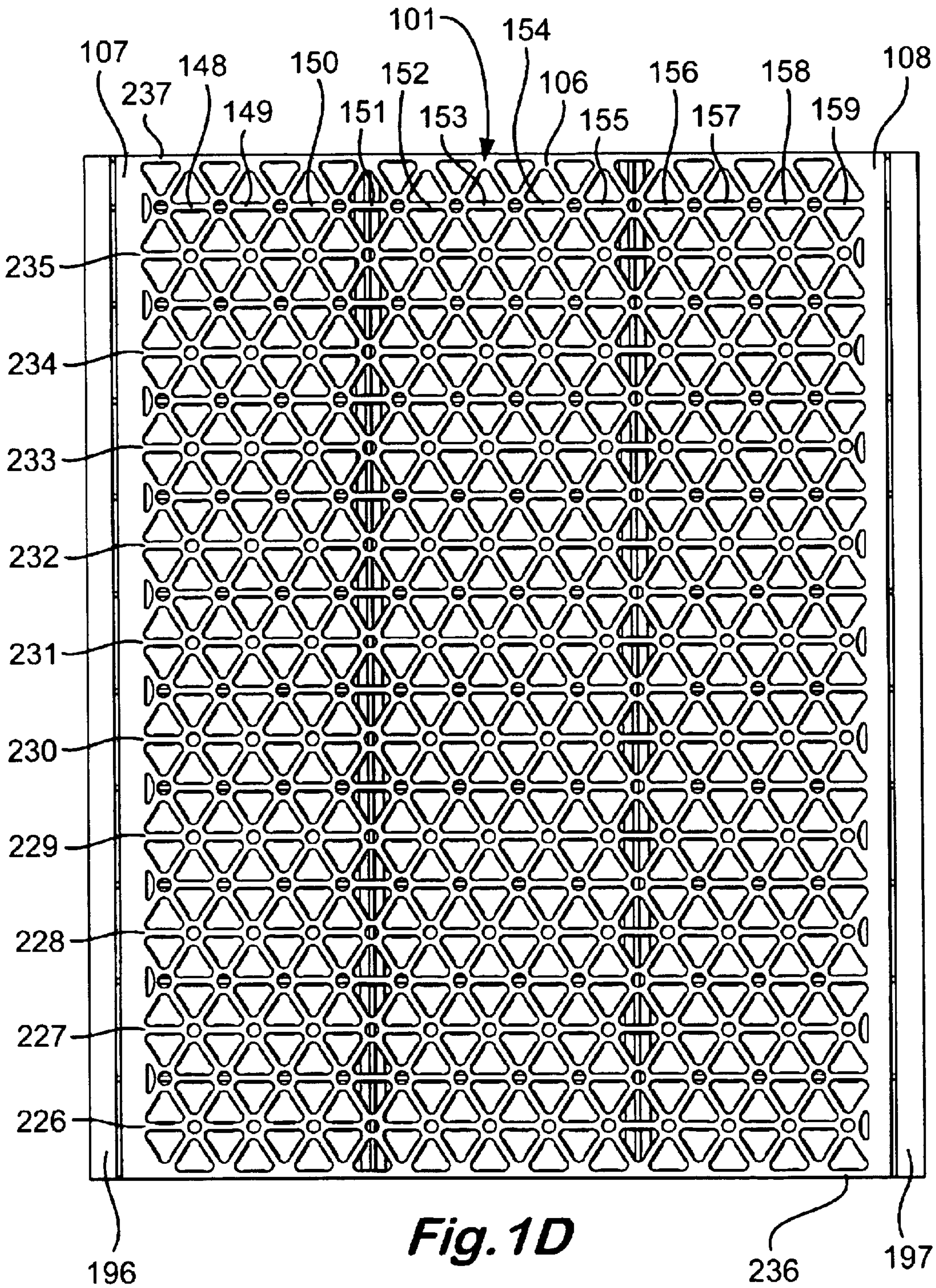
FIG. 1D is a top plan view of the panel shown in FIG. 1A fitted to the pull down member shown in FIG. 1B.
Figure 1E:
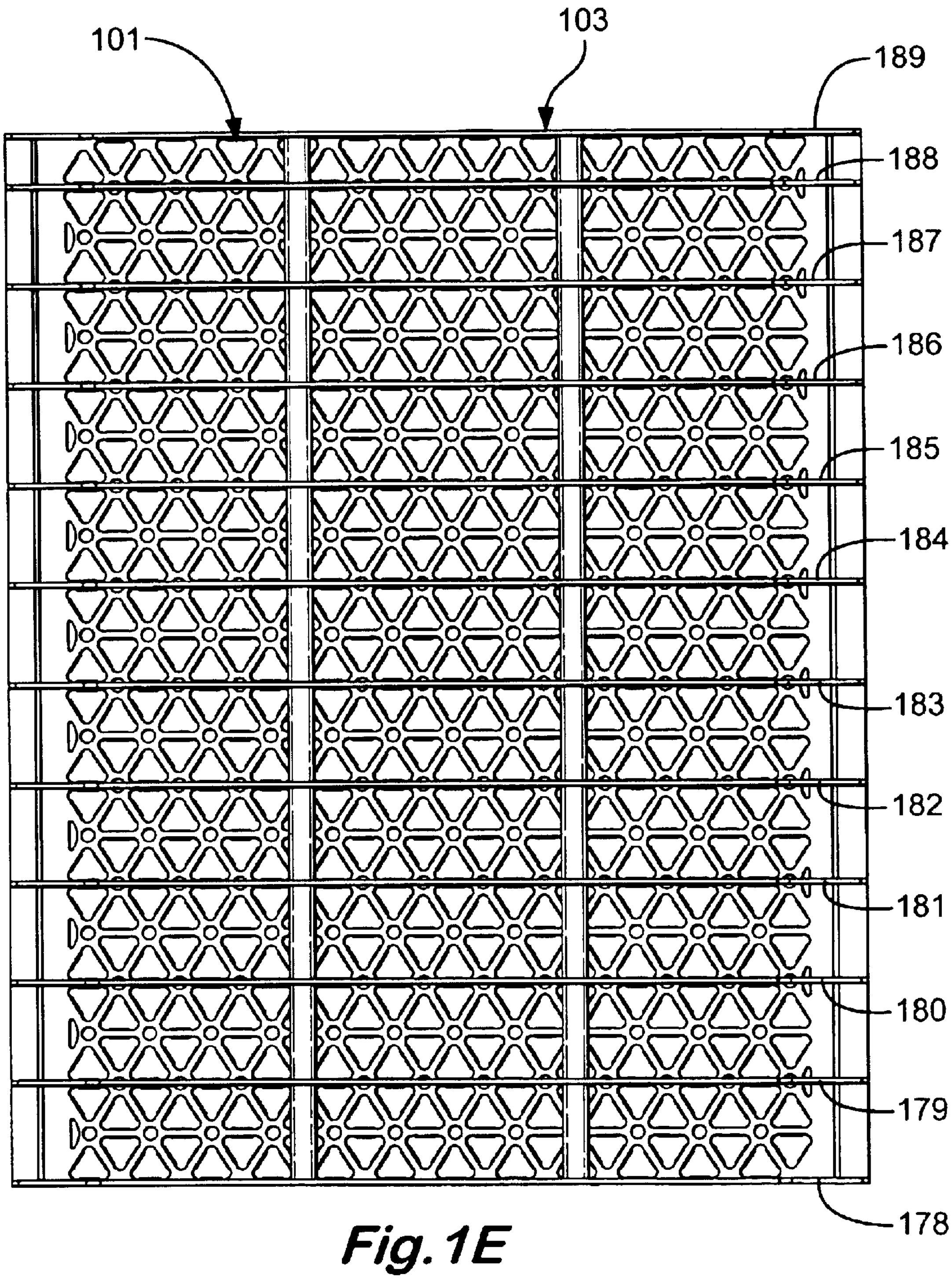
FIG. 1E is an underneath view of the panel shown in FIG. 1A fitted to the pull down member shown in FIG. 1B.
Figure 1F:
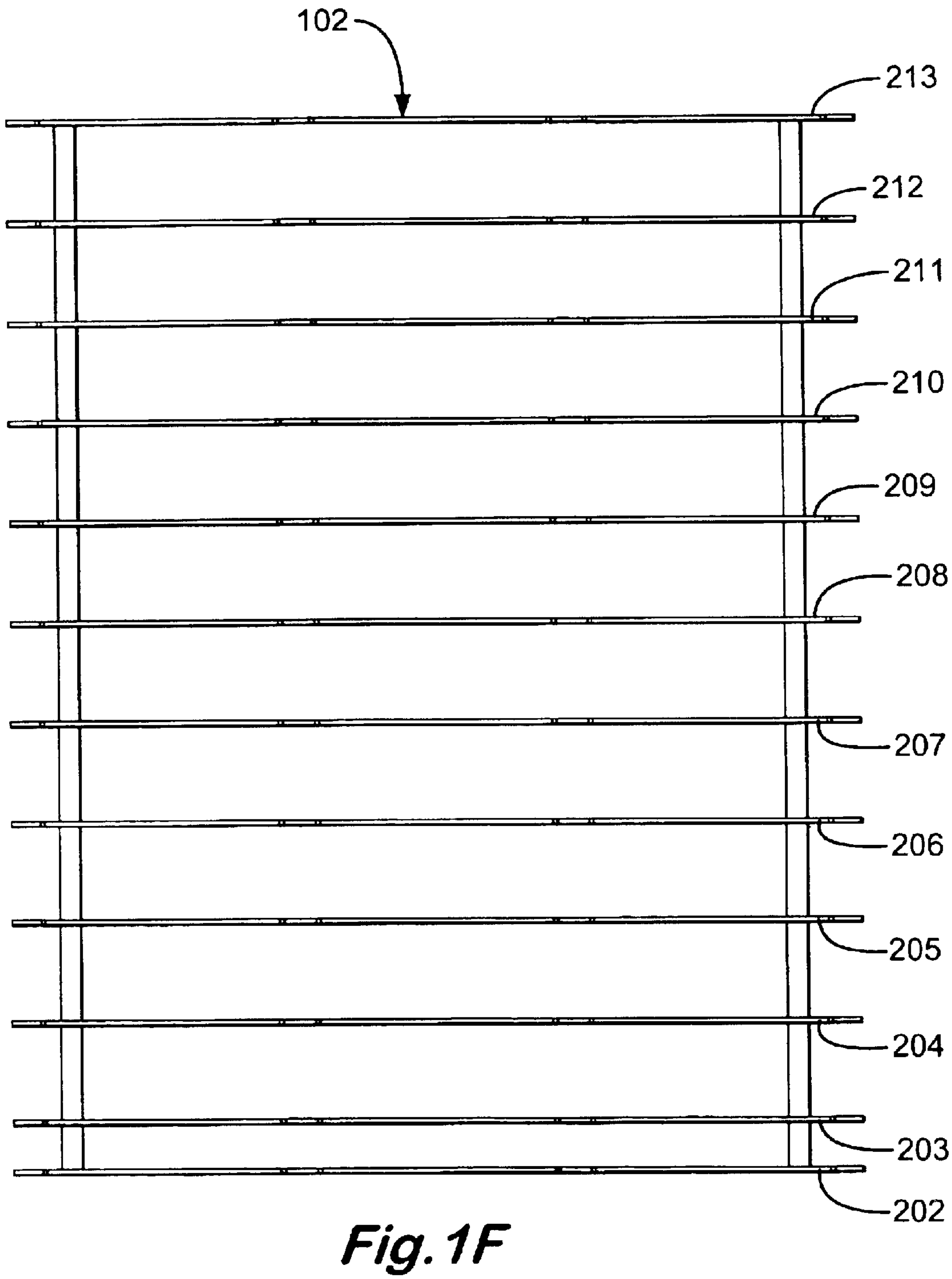
FIG. 1F is a top plan view of the support structure as shown in FIG. 1C.
Figure 1G:
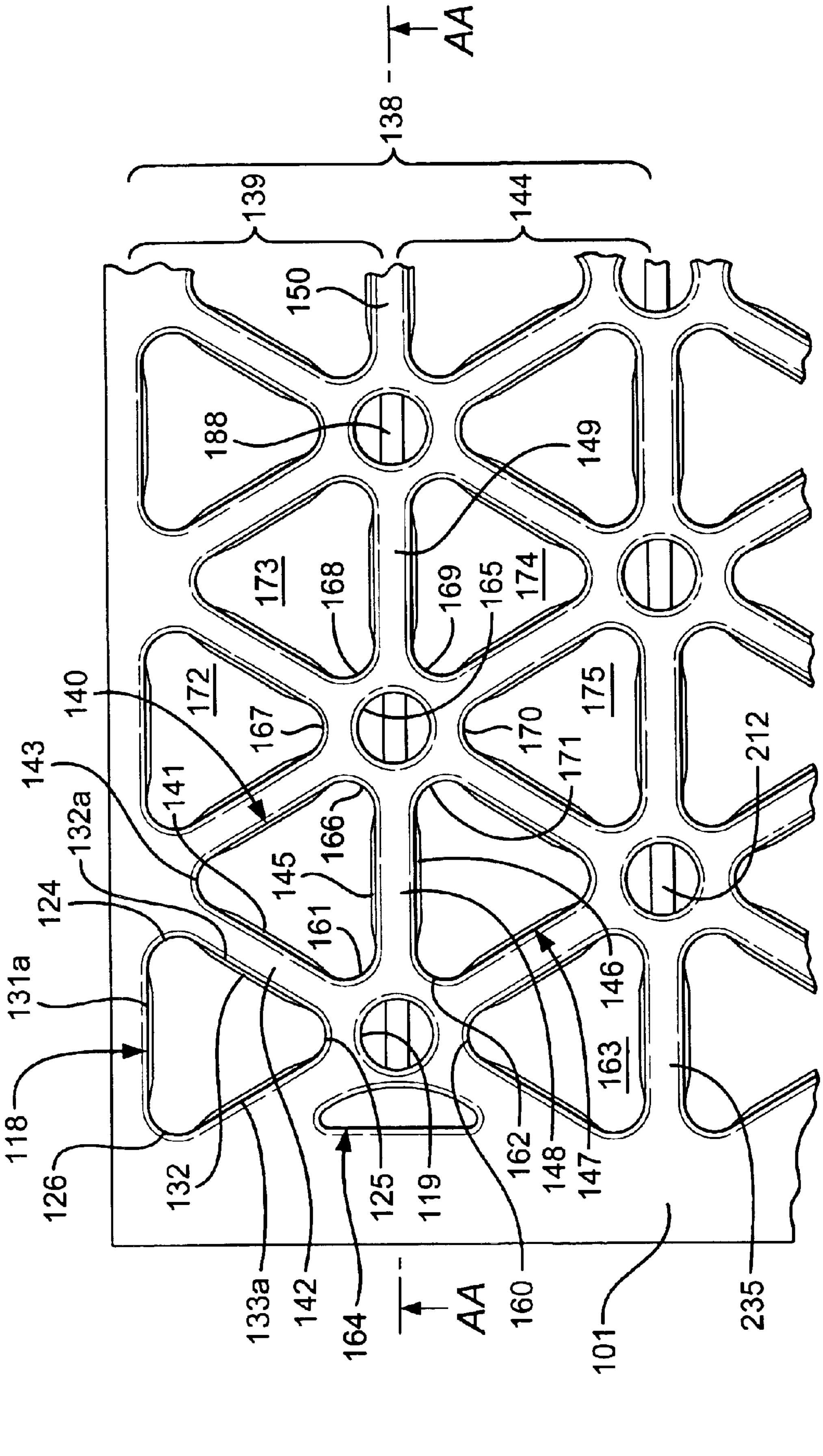
FIG. 1G is an enlarged top view of part of the panel shown in FIGS. 1 and 1D.

Referring to FIGS. 1A, 1D and 1G, the panel 101 is made from a 1.5 mm mild steel plate. The panel 101 comprises an area 106 provided with a plurality of apertures, a left side portion 107 provided with no apertures and a right side portion 108 provided with no apertures. The plurality of apertures in area 106 comprises a plurality of triangular apertures and a plurality of circular openings.

Figure 1H:
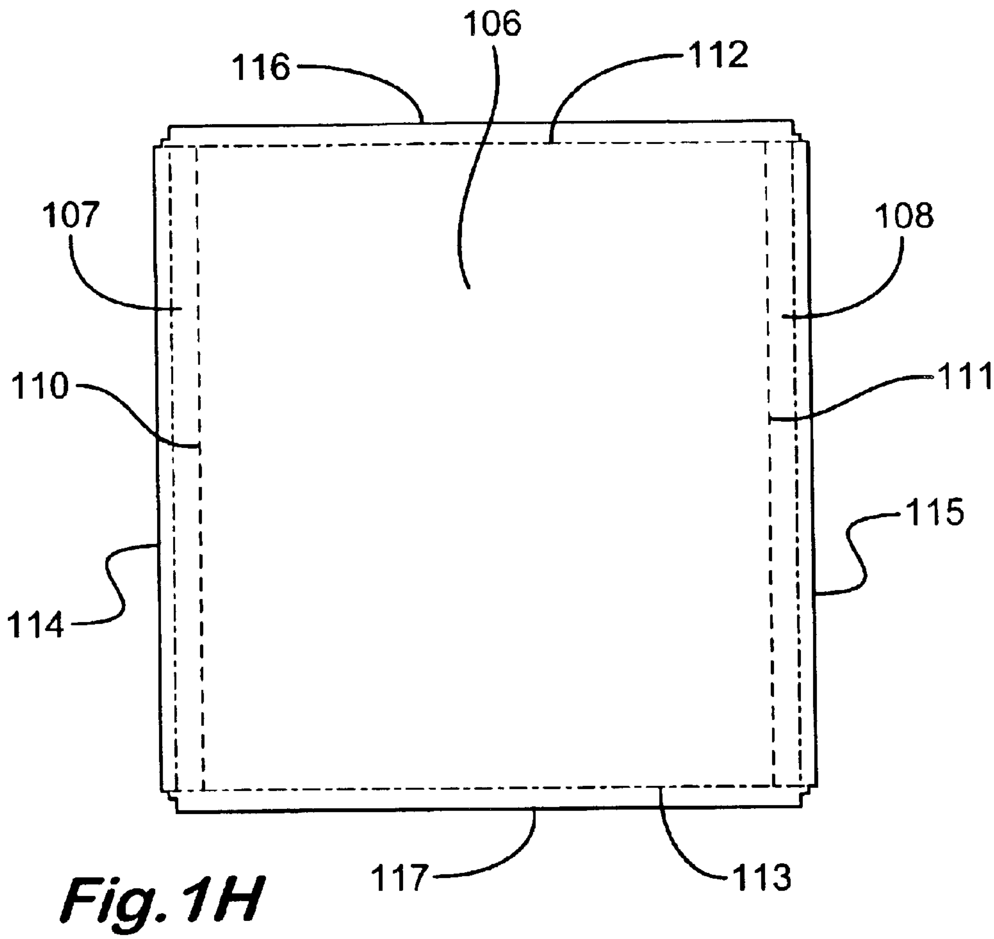
FIG. 1H is a top plan view of a blank used in the construction of a panel in accordance with the present invention.

The panel 101 is formed from a blank shown in FIG. 1H. Lines 110 and 111 and fold lines 112 and 113 indicate the boundary of area 106 which will be provided with the plurality of apertures. The area 106, the left side portion 107 and right side portion 108, all lie in the same plane to form a flat top surface. Left side portion 107 and right side portion 108 extend the entire length of the panel 101. Wing portions 114 and 115 approximately 1 cm wide extend the entire length of the panel 101. The wing portions 114 and 115 are folded downwardly to stand approximately at right angles to the top surface. The forward end of the panel 101 has a forward end portion 116 extending the width of the panel 101 and is folded downwardly along fold line 112 to be perpendicular to the top surface of the panel 101. The trailing end of the panel 101 has a rear end portion 117 folded downwardly along fold line 113, such that the rear end portion 117 lies perpendicularly to the top surface of the panel 101. A screen interface, such as those disclosed in PCT Publication Number WO 01/97947 may be used at both the front and rear of the panel. The folded wing portions 114 and 115 and the folded end portions 116 and 117 meet at their respective side edges, at which they may be welded together, soldered or otherwise joined.

Figure 1I:
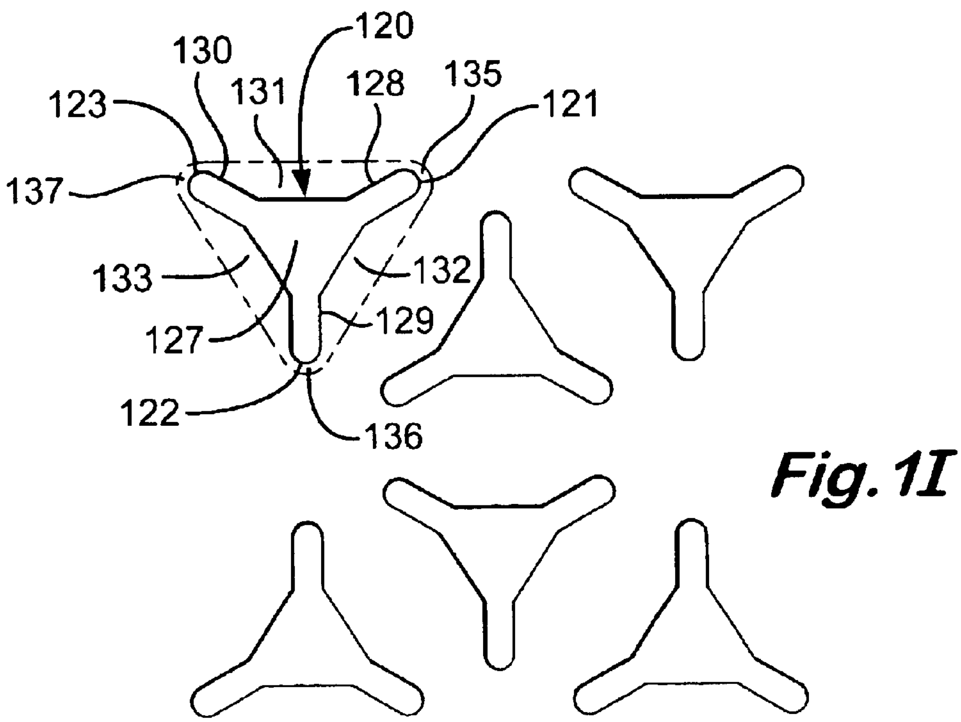
FIG. 1I is a template used in the construction of the panel of the present invention.

The area 106 of the blank shown in FIG. 1H has a plurality of apertures including a plurality of triangular apertures and a plurality of circular apertures formed therein. One of the triangular apertures is identified by reference numeral 118 and one of the circular openings is identified by reference numeral 119. The triangular aperture 118 is formed by first punching, laser cutting, sawing, drilling, milling or casting the blank with an opening 120, in the shape shown in the template shown in FIG. 1I. The shape comprises three semi circular ends 121, 122 and 123 each arranged within and close to where a respective vertex 124, 125 and 126 of the triangular aperture 118 is to be formed, as shown in FIG. 1G; and a small triangular opening 127 concentric with the triangular aperture 118 to be formed and slots 128, 129 and 130 link the semi circular ends 121, 122 and 123 to form structural portions 131, 132 and 133. The structural portions 131, 132 and 133 are folded downwardly along fold line 134, over a form tool (not shown) having a similar profile to the fold line 134. The structural portions 131, 132 and 133 are folded by the form tool to an angle of approximately 65° to the surface of the panel 101 to form edges 131*a*, 132*a*, and 133*a*. The areas 135, 136 and 137 of panel 101 bounding the semi circular ends 121, 122 and 123 are also folded downwardly.

Referring back to FIGS. 1D and 1G, triangular apertures, such as triangular aperture 118, are arranged in ten full sets of rows in the panel 101 and one further row of a set. A first set 138 comprises a first row 139 having a rearwardly pointing triangular aperture 118 and a forwardly pointing triangular aperture 140 adjacent thereto, such that folded structural portion 132 and a folded structural portion 141 of the forwardly pointing triangular aperture 140 form a panel rib 142, approximately 2.3 mm wide. An apex 143 of the forwardly pointing triangular aperture 140 is rearwardly offset by approximately 2.3 mm from a base edge 131*a* of the rearwardly pointing triangular aperture 118. The first row 139 comprises twelve forwardly pointing triangular apertures interspaced by twelve rearwardly pointing triangular apertures. The first set 138 also comprises a second row 144, which is a mirror image of the first row 139 about line A—A. A structural portion 145 of forwardly pointing triangular aperture 140 of the first row 139 and a structural portion 146 of a rearwardly pointing triangular aperture 147 of the second row 144, form a panel rib 148. The underside of panel rib 148, the structural portion 145 and the structural portion 146 form a channel. The panel rib 148 is in line with panel ribs 149 to 159 in the first set 138, the undersides of which form a channel which extends the width of the panel 101. Circular opening 119 is drilled, punched, laser cut or otherwise formed in the panel 101 between vertices 125, 160, 161 and 162 of rearward pointing triangular aperture 118, forward pointing triangular aperture 163, forward pointing triangular aperture 140 and rearward pointing triangular aperture 147 respectively. A segment opening 164 arranged between rearward pointing triangular aperture 118, forward pointing triangular aperture 163 and circular hole 119 is punched, laser cut or otherwise formed in the panel 101, having a straight portion following line 110 of the blank, shown in FIG. 1H and a curved portion extending toward the rearward pointing triangular aperture 118, forward pointing triangular aperture 163 and circular opening 119.

Similarly, circular opening 165 is drilled, punched, laser cut or otherwise formed in the panel 101 between vertices 166, 167, 168, 169, 170 and 171 of forward pointing triangular aperture 140, rearward pointing triangular aperture 172, forward pointing triangular aperture 173, rearward pointing triangular aperture 174, forward pointing triangular aperture 175, and rearward pointing triangular aperture 147 respectively.

Referring to FIG. 1A, the panel 101 further comprises two inverted T-shape rails 176 and 177, arranged longitudinally from the forward end portion 116 to the rear end portion 117. The inverted T-shape rails 176 and 177 are spaced at intermediate the left side and right side of the panel 101, preferably, each located at a third of the width between the left and right sides. The inverted T-shape rails 176 and 177 are welded to the panel 101 at the root of the T.

Referring to FIGS. 1, 1B, 1D and 1E, the pull down member 103 comprises twelve substantially identical ribs 178 to 189. Rib 178 is made from 3 mm steel plate. The rib 178 has a body portion 190, a left arm 192 extending along a top of the body portion provided with a head 193; and a right arm 194 extending along a top of the body portion provided with a head 195. A left side runner 196 is welded to the head 193 and a right side runner 197 is welded to the head 195. The left side runner 196 and right side runner 197 extend the entire length of the screen assembly 100. Two receiving rails 198 and 199 are welded in respective recesses 200 and 201 in the body portion 190, intermediate the rib 178, preferably, each located at a third of the length of the rib from either end thereof. The receiving rails 198 and 199 are of a C-shape cross-section to receive the inverted T-rails 176 and 177. The eleven other ribs 179 to 189 have corresponding heads, which are welded at intervals therealong to the left side runner 196 and right side runner 197 respectively and corresponding recesses in which receiving rails 198 and 199 are welded. The rib 178 is at a rear end; rib 179 is arranged slightly less than two intervals from rib 178; rib 180 is arranged two intervals from rib 179; rib 181 is arranged two intervals from rib 180; rib 182 is arranged two intervals from rib 181; rib 183 is arranged two intervals from rib 182; rib 184 is arranged two intervals from rib 183; rib 185 is arranged two intervals from rib 184; rib 186 is arranged two intervals from rib 185; rib 187 is arranged two intervals from rib 186; rib 188 is arranged two intervals from rib 187; rib 189 is arranged slightly less than one interval from rib 187. An interval being equal to the width of a row 139, 144 in the panel 101; and two intervals being equal to the width of a set of rows 138 in the panel 101.

Referring to FIGS. 1, 1C and 1F the support structure 102 comprises twelve substantially identical support ribs 202 to 213. Support rib 202 is made from 3 mm steel plate. The support rib 202 has a body portion 214, a left arm 215 extending from the body portion having a bottom face 216, and a right arm 217 having a bottom face 218. A left side support bar 219 is welded in recess 220 in the left side of the body portion 214 and a right side support bar 221 is welded in recess 222 in a right side of the body portion 214. The left side support bar 219 and right side support bar 221 extend the entire length of the screen assembly 100. Two recesses 223 and 224 in the body portion 214 are located intermediate the ends of the rib 202, preferably, each located at a third of the length of the rib 214 from either end thereof. The top edge 225 of the support rib 202 is provided with a chamfer. The eleven other ribs 203 to 213 are welded into corresponding recesses 220 and 221, at intervals along the left side support bar 219 and right side support bar 221 respectively. The support rib 202 is at a rear end of the screen assembly 100. Support rib 203 is arranged one interval from support rib 202; support rib 204 is arranged two intervals from support rib 203; support rib 205 is arranged two intervals from support rib 204; support rib 206 is arranged two intervals from support rib 205; support rib 207 is arranged two intervals from support rib 206; support rib 208 is arranged two intervals from support rib 207; support rib 209 is arranged two intervals from support rib 208; support rib 210 is arranged two intervals from support rib 209; support rib 211 is arranged two intervals from support rib 210; support rib 212 is arranged two intervals from support rib 211; support rib 213 is arranged two intervals from support rib 212. An interval being equal to the width of a row 139, 144 in the panel 101; and two intervals being equal to the width of a set of rows 138 in the panel 101.

The screen assembly 100 is assembled by sliding the inverted T-shape rails 176 and 177 of the panel 101 into the receiving rails 198 and 199 of the pull down member 103. The pull down member 103 is located in the support structure 102. The ribs 178 to 189 are inserted into support ribs 202 to 213. End ribs 178 and 189 are inserted inside support ribs 202 and 213. Rib 179 is arranged one interval from support rib 203 and one interval from support rib 204; Rib 180 is arranged one interval from support rib 204 and one interval from support rib 205; rib 181 is arranged one interval from support rib 205 and one interval from support rib 206; rib 182 is arranged one interval from support rib 206 and one interval from support rib 207; rib 183 is arranged one interval from support rib 207 and one interval from support rib 208; rib 184 is arranged one interval from support rib 208 and one interval from support rib 209; rib 185 is arranged one interval from support rib 209 and one interval from support rib 210; rib 186 is arranged one interval from support rib 210 and one interval from support rib 211; rib 187 is arranged one interval from support rib 211 and one interval from support rib 212; rib 188 is arranged one interval from support rib 212 and one interval from support rib 213 and slightly less than one interval from rib 189. The support ribs 203 to 212 align underneath the lines of panel ribs 226 to 235 between structural portions folded to form the edge of the apertures. Support rib 202 aligns with line of panel ribs 236 and support rib 213 aligns with line of panel ribs 237.

The panel 101 has at least one layer screening mesh arranged thereon. The layer of screening mesh may be tensioned and adhered to the outer perimeter of the panel 101 and to all of the panel ribs. Preferably, at least three layers are applied. The layers may be of the same mesh grade or of different mesh grades. Preferably, a layer of screening mesh having larger openings and larger wires lies beneath layers of fine mesh.

In use, the screen assembly 100 having layers of mesh (not shown) arranged on the panel, is slid into clamping rails 104 and 105 of a shale shaker. The clamping rails 104 and 105 comprise a C-shape rail 240 and 241 having a bottom surface 242 and 243 on which the support structure 102 of the screen assembly 100 rests. The C-shape rail 240 and 241 also has a pneumatically inflatable bladder 244 and 245 fixed to an upper part 246 and 247 of the C-shape rail. The inflatable bladder 244, 245 is inflated which pushes down on side portions 107 and 108 of the panel 101, pushing the panel 101 on to the top edges 225 of the twelve supporting ribs 202 to 213. The pneumatic bladder also engages side runners 196 and 197 of the pull down member 103, which pushes the pull down member 103 downwardly, pulling the inverted T-shape rails downwardly within recesses 223 and 224. The panel 101 is pulled down along the inverted T-shape rail to pull the panel 101 down on to the supporting ribs 202 to 213. The supporting ribs 202 to 213 lie underneath the circular openings 119, 165, which partially blinds the openings, however, this is not significant as the ribs are below the level of the top surface of the layers of screening mesh.

The downwardly folded wings 114 and 115 of the panel 101 locate over the ends of the supporting ribs 202 to 213 and forward end portion 116 and rear end portion 117 are located over supporting rib 213 and 202.

Drilling mud having solids entrained therein is introduced at a feed end of the shale shaker and is shaken along the layers of mesh on the screen assembly. Fluid and small particles pass through the layers of mesh on the screen and through the triangular apertures and the circular openings in the panel 101 and past the pull down member 103 and the support structure 102 and into a receiver (not shown). The larger solids pass over the layers of screening material and out of a discharge end of the shale shaker into a skip or ditch.

The most likely component to wear out or fail first, is the layers of screening material arranged on the panel 101. The screen assembly 100 is removed from the C-shape rails 104 and 105. The panel 101 having layers of worn out screening mesh thereon and the pull down member 103 may be lifted from frictional engagement with the support structure 102. The panel 101 is slid out from receiving rails 198 and 199 and replaced with a new panel having layers screen mesh thereon. The rails of the new panel are slid into the receiving rails of the pull down member 103. The pull down member

103 with the new panel is placed on the original support structure 102 and slid back into the shale shaker.

It is envisaged that the panel may be of any known type, such as 1.5 mm to 3 mm steel, aluminium or plastics material plate with a multiplicity of apertures punched therein or perforated plate, not having folded edges to the apertures. The apertures may be oblong, pentagonal, hexagonal, heptagonal, octagonal, circular or any other shape.

Referring to FIG. 2, there is shown a screen assembly comprising at least one layer of screening material 300 overlying a panel 301 and a support structure 302. The panel 301 comprises a flat 3 mm mild steel plate. The panel 301 has left and right side portions 304 and 305 which are not provided with apertures and a central portion 307 provided with a multiplicity of apertures and openings arranged in the same configuration as described above with reference to panel 101 shown in FIGS. 1, 1D and 1E. It should be noted that the left and right side portions 304 and 305 are wider than the left and right side portions 107 and 108 in the panel 101.

The support structure 302 comprises a left side plate 308 and a right side plate 309 and twelve substantially identical crowned ribs 310 to 321 welded to the left and right side plates 308, 309. The crowned rib 310 is made from 3 mm mild steel plate having a crowned top edge 322, whose central point 323 is approximately 5 mm above a horizontal line joining two top corners 324 and 325 of the crowned rib 310.

The crowned ribs 310 to 321 are spaced along the left and right side plates at a distance equal to two intervals, an interval as defined with reference to FIGS. 1, 1D and 1E above with reference to the panel 101, as being equal to the width of a row of apertures in the panel 301; and two intervals being equal to the width of a set of rows (two rows) in the panel 301.

In use, the panel 310 having layers of mesh 300 adhered thereto, is laid on to the top of the crowned ribs 310 to 321. Preferably, in-line panel ribs 326 to 329 (others not shown) lying parallel to the rear edge 306 of panel 301, each lie over the crowned ribs 310 to 321, such that, the crowned ribs do not substantially occlude the apertures and openings. As shown in FIG. 2A, the screen assembly is slid into clamping rails 330 (only one shown) arranged on each side of a basket of a shale shaker. The clamping rail 330 comprises a C-shape rail 331 having a bottom surface 332 on which the support structure 302 of the screen assembly rests. The C-shape rail 330 also has a pneumatically inflatable bladder 333 fixed to an upper part 334 of the C-shape rail 330. The C-shape rail 330 is fixed to the side of a left side wall 335 of the basket to receive the left side of the screen assembly. A further C-shape rail (not shown) is fixed to a right side wall (not shown) of the basket to receive the right hand side of the screen assembly. Once the screen assembly is slid into the C-shape rails 330 and (not shown), the pneumatically inflatable bladder 333 is inflated which pushes down on left and right side portions 304 and 305 pushing and holding the panel 301 over the crowned ribs 310 to 321, rigidly fixing the panel 301, as shown in FIG. 2B.

Drilling mud having solids entrained therein is introduced at a feed end of the shale shaker and is shaken along the layers of mesh on the screen assembly. Fluid and small particles pass through the layers of mesh 300 and the triangular apertures and the circular openings in the panel 301 and past the support structure 302 and into a receiver (not shown). The larger solids pass over the layers of screening material and out of a discharge end of the shale shaker into a skip or ditch.

The most likely component to wear out or fail first, is the layers of screening material 300. The screen assembly may be removed from the C-shape rails 330 and the panel 301 having layers of worn out screening mesh arranged thereon and replaced with a new panel having layers screen mesh thereon. The new panel is placed on the original support structure 302 and slid back into the shale shaker.

A further embodiment of a screen assembly is shown in FIG. 3. The screen assembly 400 comprises a panel 401 on which layers of screening material (not shown) are arranged, and a support structure 402. The support structure is substantially identical to the support structure 402, save for the left and right side plates 404 and (not shown), which are arranged in a recesses 405 and (not shown) near to the ends of the crowned ribs 406. A portion 407 has been removed from each crowned rib 405, which amongst other things, facilitates insertion of the screen assembly in clamping rails 408, 408*a* of a shale shaker 409.

The panel 401 is of the type shown in FIGS. 1, 1D and 1E, save for the inverted T-shape rails, which are omitted, and larger left and right side portions 410 and 410*a* provided with no apertures or openings. The panel 401 has folded left wing portion 411 and folded right wing portion (not shown), folded front end (not shown) and a folded rear end 412.

In use, the panel 401 has layers of mesh adhered thereto, and is laid on to the top of the crowned ribs 406. Preferably, in-line panel ribs lying parallel to the folded rear end 412 of panel 401, each lie over the crowned ribs like crowned rib 406, such that, the crowned ribs do not substantially occlude the apertures and openings. The screen assembly is slid into clamping rails 408, 408*a* arranged on each side of a basket 413 of a shale shaker 409. The clamping rails 408, 409 comprise a C-shape rails each having a bottom surface on which the support structure 402 of the screen assembly rests. Each of the C-shape rails also has a pneumatically inflatable bladder 414 fixed to an upper part 334 of the C-shape rail 330. Once the screen assembly 400 is slid into the clamping rails 408, 408*a*, the pneumatically inflatable bladder 414 is inflated which pushes down on left and right side portions 410 and (not shown) pushing and holding the panel 401 over the crowned ribs, rigidly fixing the panel 301. The folded left wing portion 411 and folded right wing portion (not shown), folded front end (not shown) and a folded rear end 412 fit about the support structure 406.

The layers of mesh used in any of the embodiments shown herein and in any embodiment of the invention, may be pre-tensioned and adhered, bonded or otherwise attached to the panel. The layer of mesh may be bonded using a heat activated powder.

What is claimed is:

1. A screen assembly for a shale shaker, the screen assembly comprising a panel and a support structure, the panel having an area provided with a multiplicity of apertures and a least one layer of screening material on top of the panel over the multiplicity of apertures, wherein said panel is removable from said support structure, and wherein said panel comprises a flat punched plate, and wherein said screen assembly further comprises a pull down member located within said panel for pulling said panel on to said support structure.

2. The screen assembly as claimed in claim 1 wherein said support structure is removable from aid shale shaker.

3. The screen assembly as claimed in claim 1 wherein said screen assembly is insertable into a clamping mechanism of a shale shaker.

4. The screen assembly as claimed in claim 1 wherein there is a friction fit between the panel and the support structure.

5. The screen assembly as claimed in claim 1 wherein said pull down member is linked to said panel at at least two intermediate points.

6. The screen assembly as claimed in claim 1 wherein said pull down member is releasably connected to the panel.

7. The screen assembly as claimed in claim 6 wherein said pull down member comprises a rail.

8. The screen assembly as claimed in claim 7 wherein said panel comprises a rail, which cooperates with said rail of said pull down member to enable the pull down member to pull on said panel.

9. The screen assembly as claimed in claim 1 wherein said panel has a perimeter and the pull down member is located inside the perimeter.

10. The screen assembly as claimed in claim 1 wherein said pull down member is arranged such that, in use, it is operated by the clamping mechanism of said shale shaker.

11. The screen assembly as claimed in claim 10 wherein said panel has a perimeter, at least part of which, in use is arranged in said clamping mechanism and is pushed on to said support structure wherein operated.

12. The screen assembly as claimed in claim 1 wherein said pull down member comprises at least one rib.

13. The screen assembly as claimed in claim 12 wherein the panel has a perimeter and said at least one rib extends beyond said perimeter.

14. The screen assembly as claimed in claim 12 wherein said at least one rib has two ends each having a top face which, in use is contactable by said clamping mechanism.

15. The screen assembly as claimed in claim 11 wherein the pull down member comprises a plurality of ribs linked by a side runner on each of said two ends to form said top face which, in use is contactable by said clamping mechanism of said shale shaker.

16. The screen assembly as claimed in claim 1 wherein said support structure comprises a plurality of support ribs on which, in use the panel is pushed or pulled on to.

17. The screen assembly as claimed in claim 16 wherein each support rib has a top edge which is flat, in use the panel is pushed or pulled on to the flat top edge.

18. The screen assembly as claimed in claim 16 wherein support structure has a crowned profile and the panel is pushable down over the support structure by a clamping mechanism at an outer perimeter of the panel.

19. The screen assembly as claimed in claim 1 wherein the at least one layer of screening material is wire mesh.

20. A screen assembly for a shale shaker, the screen assembly comprising a panel and a support structure, the panel comprising a flat punched plate having an area provided with a multiplicity of apertures and at least one layer of screening material on top of he panel over the multiplicity of apertures, the at least one layer of screening material comprising wire mesh wherein said panel is removable from said support structure, and wherein said screen assembly further comprises a pull down member located with said panel for pulling said panel on to said support structure.

* * * * *